Aug. 10, 1965  W. McBRIDE  3,199,646
FLUID CLUTCH MID-SHAFT
Filed May 28, 1962
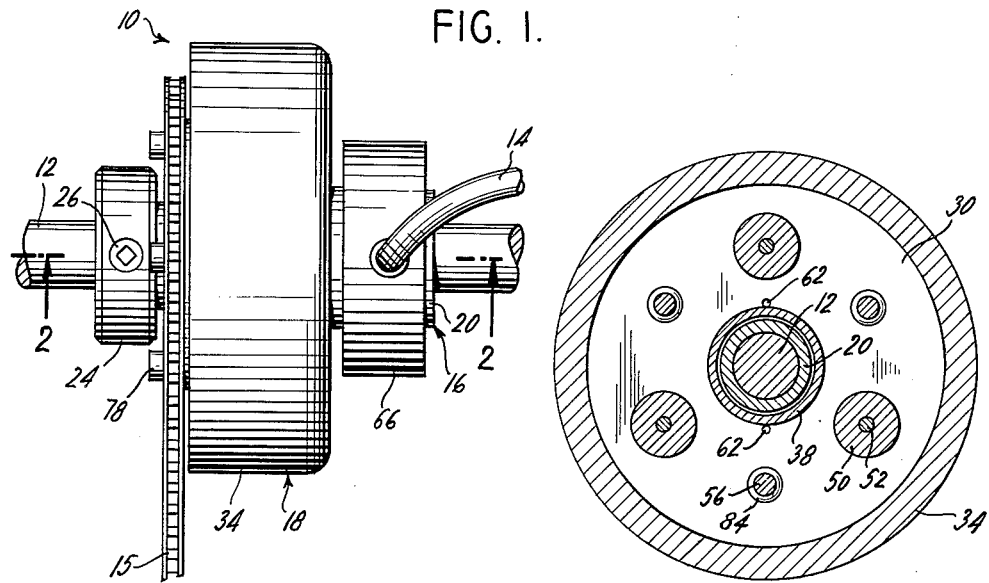
FIG. 1.
FIG. 3.
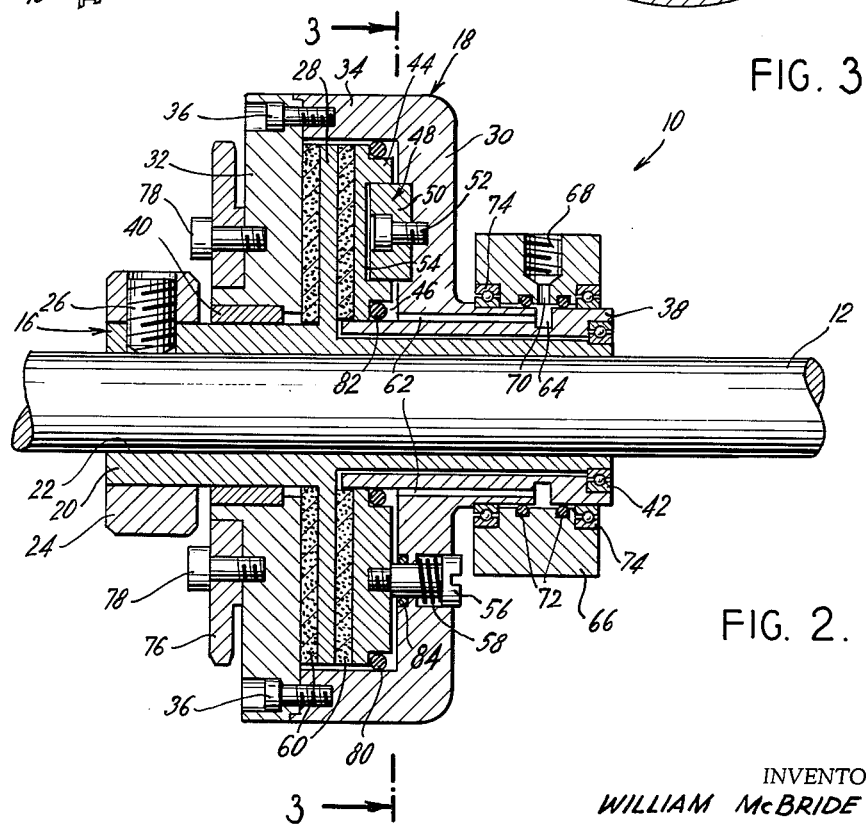
FIG. 2.
INVENTOR.
WILLIAM McBRIDE
BY
Armster & Levy
ATTORNEYS

United States Patent Office 3,199,646
Patented Aug. 10, 1965

3,199,646
FLUID CLUTCH MID-SHAFT
William McBride, Emporium, Pa., assignor to Emporium Specialties Co., Inc., Emporium, Pa., a corporation of Pennsylvania
Filed May 28, 1962, Ser. No. 198,106
2 Claims. (Cl. 192—85)

The present invention relates generally to fluid clutches and specifically to a fluid clutch for installation along the length of a shaft for the selective transmission of power from the rotating shaft through the fluid clutch to externally located machinery.

There exists a need for a small fluid controlled clutch which may be mounted along the length of a shaft in a manner similar to the mounting of a pulley or chain sprocket along the length of a shaft which may be utilized to selectively transmit power from the shaft to an external rotating element.

Accordingly, it is generally an object of the present invention to provide an improved selectively driven fluid-controlled clutch (air or liquid) for mounting intermediate the ends of a drive shaft. Specifically, it is an object of the present invention to provide a clutch having means for mounting the clutch at an intermediate location along the length of the shaft and including rotating coupling means for supplying fluid to the clutch in order to control its operation.

It is a further object of the present invention to provide a fluid controlled clutch including a shaft adapter and clutch plate adapted for securement intermediate the ends of a shaft and a clutch housing fluid coupling assembly which may selectively rotate with the dirven clutch plate in response to the introduction of fluid into the device.

In accordance with one illustrative embodment of the present invention, there is provided a fluid controlled clutch adapted for mounting at an intermediate location along the length of a shaft. The clutch comprises a hub and clutch plate assembly including a generally cylindrical hub having a central axial opening for the rotating shaft, securement means to secure the hub to the shaft and a clutch plate coaxial with and perpendicular to the hub intermediate its ends. A clutch housing is provided including a facing plate, a backing plate spaced therefrom and an interconnecting marginal flange. Bearing means are provided for mounting the housing on the hub with the clutch plate positioned between the backing plate and the facing plate. An annular presser plate is positioned within the housing and between the clutch plate and the facing plate forming a variable volume chamber therebetween. The presser plate is coupled to the facing plate for rotation therewith and for axial movement with respect thereto to vary the volume of the chamber. Fluid entry means are provided by way of an axial extension of the facing plate and a rotatable fluid coupling collar is mounted thereon. A passageway is provided within the fluid collar and through the axial extension into the variable volume chamber. Sealing means are provided to prevent the loss of fluid from the variable volume chamber as fluid under pressure is pumped therein to force the presser plate away from the facing plate. Friction means are positioned between the clutch plate and the backing plate and between the clutch plate and the facing plate such that frictional interconnection is provided between the hub and clutch plate assembly and the housing. Power take off means are secured to the housing for rotation therewith in response to the introduction of fluid into the clutch.

The above brief description, as well as further objects, features and advantages of the prevent invention, will be best appreciated when taken in conjunction with the accompanying drawings wherein:

FIG. 1 is an elevational view of a fluid controlled clutch according to the present invention which is mounted intermediate the ends of a driving shaft;

FIG. 2 is a sectional view along the line 2—2 of FIG. 1 looking in the direction of the arrows illustrating the various components of the fluid clutch; and FIG. 3 is a secttional view along the line 3—3 of FIG. 2 looking in the direction of the arrows.

Referring now specifically to the drawings, there is shown a fluid controlled clutch, generally designated by the numeral 10, which is mounted on a driving shaft 12 and which is provided with an input hose 14 for the introduction of the controlling fluid to govern the operations of the clutch. An output chain 15 is secured to the clutch 10 as a power take off device.

The fluid clutch 10 comprises a driving hub and clutch plate assembly 16 and a cooperating driven clutch plate housing 18. The hub and clutch plate assembly 16 generally includes an elongated, substantially cylindrical hub 20 which is formed with an axial opening 22 adapted to receive a shaft 12. As may be seen in the drawings, the opening 22 extends completely through the hub 20 such that the clutch 10 may be mounted intermediate the ends of the shaft. Securement means including a mounting collar 24 and a screw 26 are provided for securing the hub 20 to the shaft 12 for rotation therewith. Intermediate the ends of the hub 20 there is provided a clutch plate 28 which is co-axial with and perpendicular to the hub 20 and rotates therewith.

The housing 18 includes a facing plate 30, a backing plate 32 parallel to and spaced therefrom and interconnecting marginal flange 34. In the present illustrative embodiment, the marginal flange 34 is integral with the facing plate 30 and the backing plate 32 is secured thereto by means of the mounting bolts 36. An axial extension 38 is formed with the facing plate 30 and extends in a direction opposite to that of the marginal flange 34. The housing 18 is mounted for rotation on the hub and clutch plate assembly 16 by means of a pair of bearings. The first bearing 40 is positioned between the backing plate 32 and the hub 20 on one side of the clutch plate 28 and the second bearing 42 is positioned between the facing plate 30, at its extension 38, and the hub 20 on the other side of the clutch plate 28.

An annular presser plate 44 is positioned between the facing plate 30 and the clutch plate 28 and about the hub 20 and forms a variable volume chamber 46 bounded by the presser plate 44, the facing plate 30, the marginal flange 34, and the hub 20. The presser plate 44 is coupled to the housing by means of the coupling members 48 each of which includes a circular plug 50 secured to the back plate by a bolt 52 which is received within a depression 54 formed in the front face of the presser plate 44. In addition, the presser plate 44 may be provided with biasing means to bias the presser plate toward the facing plate 30 and to reduce the volume of the variable volume chamber 46. The biasing means includes a stud bolt 56 threaded into the presser plate 44 which extends through an opening in the facing plate and a compression spring 58 positioned between the outside surface of the face plate 30 and the head of the stud bolt 58. As may be seen in FIG. 3, three coupling members 48 and biasing elements are incorporated in clutch 10.

Sealing means are provided to prevent the loss of fluid from the variable volume chamber 46 including the O rings 80 and 82 on the presser plate 44 and the O rings 84 provided about the bolts 56 of the biasing means.

A pair of carbon friction disks 60 is positioned on either side of the clutch plate 28 and in contact with the backing plate 32 and the presser plate 44 respectively. It will be appreciated that upon movement of the presser plate 44 away from the facing plate 30, a normal force will be applied between the carbon friction disks 60 and the clutch plate 28 and between the carbon disks and the backing plate 32 and presser plate 44 thus providing a frictional interconnection between the various members.

The movement of the presser plate 44 is instituted by the introduction of fluid under pressure into the variable volume chamber 46 through a passageway 62 formed axially in the extension 38 of the facing plate 30. An annular groove 64 is formed in the extension 38, in communication with the chamber 46 and a rotating fluid coupling member 66 is mounted on the extension 38 and positioned around the annular groove 46. Securement means 68 are provided within the rotating coupling 66 for the connection of the fluid hose 14 thereto for the delivery of fluid under pressure. A small communication port 70 leads radially inwardly of the rotating coupling 66 and provides a continuous passage from the hose 14 through the coupling 66, through the groove 64 and the passageway 62 into the variable volume chamber 46. The rotating coupling 66 includes sealing means comprising a pair of O rings 72 and bearing means comprising the ball bearings 74.

It will be appreciated that upon the introduction of fluid through the hose 14 pressure will be built up within the variable chamber 46 forcing the pressure plate 44 to move away from the facing plate 30. Therefore, the normal forces will be built up on the friction disks 60 such that a frictional interengagement is made between the hub and clutch plate assembly 16 and the clutch housing 18. A power take off element, comprising the chain sprocket 76, is connected to the housing 18, and in the present illustrative case to the backing member 32, by means of the bolts 78. The chain 15 is secured about the sprocket wheel 76 for the delivery of power to an external rotating element.

From the foregoing, it will be appreciated that there is provided a fluid controlled clutch which may be easily and conveniently secured to a rotating shaft at a point intermediate its ends and, if desired, simply remove from the shaft. Rotating coupling means are provided for the introduction of fluid to the housing and power take off means are secured to the housing such that rotational power from the driving shaft may be selectively picked off for transference to an external rotating element. The clutch according to the present invention may be also used as a selectively engageable braking element simply by securing the housing 18 against rotation. The introduction of fluid into the clutch will then apply a frictional drag to the clutch plate 28 and therefore to the rotating shaft 12.

The foregoing is a description of one illustrative embodiment of the present invention. Other fluid clutch embodiments of the invention may be devised. Therefore, the following claims should be interpreted broadly in a manner consistent with the spirit and scope of the invention.

What I claim is:

1. A fluid-controlled clutch for mounting at an intermediate location along the length of a shaft comprising a hub and clutch plate assembly including a generally cylindrical hub having an axial opening therethrough for receiving a shaft, securement means for securing the hub to the shaft, and a clutch plate coaxial with and perpendicular to the hub intermediate its ends, a clutch housing including a facing plate, a backing plate, and a marginal flange within which is positioned said clutch plate, said backing plate formed with a central axial opening larger than an outer diameter of said cylindrical hub, said hub positioned within said backing plate axial opening and extending through said backing plate, bearing means mounting said housing on said hub and clutch plate assembly including a first bearing between said backing plate and said hub on one side of said clutch plate and a second bearing between said facing plate and said hub on the other side of said clutch plate, an annular presser plate positioned coaxial to and within said housing about said hub between said clutch plate and said facing plate forming a variable volume chamber within said facing plate, presser plate, marginal flange and hub, coupling means mounting said presser plate for rotation with said housing and for axial movement with respect thereto for varying the size of said variable volume chamber, an axial extension of said facing plate including passage means therethrough for entry of fluid into said variable volume chamber, said axial extension of said facing plate formed with a central axial opening larger than the axial opening of said hub for receiving the shaft on which said clutch is to be mounted, a rotatable fluid coupling collar mounted for rotation about said axial extension in communication with said passage means, sealing means for preventing the loss of fluid from said variable volume chamber including seals between said presser plate and said marginal flange and said hub and between said rotatable fluid coupling collar and said axial extension, friction means between said clutch plate and said backing plate and said presser plate for frictionally interconnecting said clutch plate and said housing when said presser plate is moved away from said facing plate, and power take-off means secured to said housing for rotation therewith when driven from said hub in response to the introduction of fluid into said clutch.

2. A fluid-controlled clutch for mounting at an intermediate location along the length of a shaft comprising a hub and clutch plate assembly including a generally cylindrical hub having an axial opening therethrough for receiving a shaft, securement means for securing the hub to the shaft, and a clutch plate coaxial with and perpendicular to the hub intermediate its ends, a clutch housing including a facing plate, a backing plate, and a marginal flange within which is positioned said clutch plate, said backing plate formed with a central axial opening larger than an outer diameter of said cylindrical hub, said hub positioned within said backing plate axial opening and extending through said backing plate, bearing means mounting said housing on said hub and clutch plate assembly including a first bearing between said backing plate and said hub on one side of said clutch plate and a second bearing between said facing plate and said hub on the other side of said clutch plate, an annular presser plate positioned coaxial to and within said housing about said hub between said clutch plate and said facing plate forming a variable volume chamber within said facing plate, presser plate, marginal flange and hub, coupling means mounting said presser plate for rotation with said housing and for axial movement with respect thereto, biasing means for biasing said presser plate toward said facing plate for reducing the volume of said variable volume chamber, an axial extension of said facing plate including passage means therethrough for entry of fluid into said variable volume chamber, said axial extension of said facing plate formed with a central axial opening larger than the axial opening of said hub for receiving the shaft on which said clutch is to be mounted, a rotatable fluid coupling collar mounted for rotation about said axial extension in communication with said passage means, sealing means for preventing the loss of fluid from said variable volume chamber including seals between said presser plate and said marginal flange and said hub and between said rotatable fluid coupling collar and said axial extension, friction means between said clutch plate and said backing plate and said presser plate for frictionally interconnecting said clutch plate and said housing when said presser plate is moved away from said facing plate, and power take-off means secured to said housing for rotation therewith when driven from said hub in response to the introduction of fluid into said clutch.

References Cited by the Examiner

UNITED STATES PATENTS

| | | |
|---|---|---|
| 506,517 | 10/93 | Leibert. |
| 644,749 | 3/00 | Wiehl. |
| 1,300,898 | 4/19 | Vincent. |
| 2,108,165 | 2/38 | Criley. |
| 2,402,052 | 6/46 | Johansen. |
| 2,759,582 | 8/56 | Dehn. |
| 2,883,019 | 4/59 | Kershner et al. _____ 192—87 X |

FOREIGN PATENTS

| | | |
|---|---|---|
| 213,165 | 1/61 | Austria. |

DAVID J. WILLIAMOWSKY, *Primary Examiner.*

THOMAS J. HICKEY, *Examiner.*